US008853531B2

(12) United States Patent
Schwede et al.

(10) Patent No.: US 8,853,531 B2
(45) Date of Patent: Oct. 7, 2014

(54) PHOTON ENHANCED THERMIONIC EMISSION

(75) Inventors: Jared Schwede, Menlo Park, CA (US); Nicholas Melosh, Menlo Park, CA (US); Zhixun Shen, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1075 days.

(21) Appl. No.: 12/589,122

(22) Filed: Oct. 16, 2009

(65) Prior Publication Data
US 2010/0139771 A1   Jun. 10, 2010

Related U.S. Application Data

(60) Provisional application No. 61/196,268, filed on Oct. 16, 2008.

(51) Int. Cl.
| | |
|---|---|
| *H01L 31/00* | (2006.01) |
| *H01J 40/06* | (2006.01) |
| *H02S 10/00* | (2014.01) |
| *H01J 45/00* | (2006.01) |

(52) U.S. Cl.
CPC  *H01J 40/06* (2013.01); *H02N 6/00* (2013.01); *H01J 45/00* (2013.01); *H01J 2201/30434* (2013.01)
USPC .......................................... 136/261; 313/310

(58) Field of Classification Search
USPC ........................................................ 136/261
See application file for complete search history.

(56) References Cited

U.S. PATENT DOCUMENTS

| | | | |
|---|---|---|---|
| 3,510,714 A * | 5/1970 | Geer .............................. | 136/254 |
| 5,461,280 A | 10/1995 | Kane | |
| 5,973,259 A | 10/1999 | Edelson | |
| 6,127,624 A * | 10/2000 | Ishida et al. .................. | 136/257 |
| 6,441,298 B1 | 8/2002 | Thio | |
| 2005/0206314 A1* | 9/2005 | Habib et al. .................. | 313/542 |

OTHER PUBLICATIONS

Machuca et al., "Role of oxygen in semiconductor negative electron affinity photocathodes", Microelectronics and nanometer structures, 2002.*

(Continued)

*Primary Examiner* — Matthew Martin
(74) *Attorney, Agent, or Firm* — Lumen Patent Firm (57) ABSTRACT

Photon Enhanced Thermionic Emission (PETE) is exploited to provide improved efficiency for radiant energy conversion. A hot (greater than 200° C.) semiconductor cathode is illuminated such that it emits electrons. Because the cathode is hot, significantly more electrons are emitted than would be emitted from a room temperature (or colder) cathode under the same illumination conditions. As a result of this increased electron emission, the energy conversion efficiency can be significantly increased relative to a conventional photovoltaic device. In PETE, the cathode electrons can be (and typically are) thermalized with respect to the cathode. As a result, PETE does not rely on emission of non-thermalized electrons, and is significantly easier to implement than hot-carrier emission approaches.

12 Claims, 6 Drawing Sheets

(56) References Cited

OTHER PUBLICATIONS

Ross et al., "Efficiency of hot-carrier solar energy converters", 1982, pp. 3813-3818, Applied Physics Letters v53n5.

Smestad, "Conversion of heat and light simultaneously using a vacuum photodiode and the thermionic and photoelectric effects", 2004, pp. 227-240, Solar Energy Materials and Solar Cells v82.

Goldmann et al., "Temperature effects in angle-resolved photoemission spectra from metals", 1993, pp. 331-350, Progress in Surface Science v42.

Ross, "High efficiency in 'semithermal' solar energy converters", 1983, pp. 2883-2884, Applied Physics Letters v54n5.

White et al., "Nondirect transitions in variable-temperature angle-resolved photoemission from metals", 1987, pp. 1147-1165, Physical Review B v35n3.

Matzdorf et al., "Temperature-dependent photoemission spectra from Cu(100) and Cu(111) surfaces", 1993, pp. 56-65, Surface Science v286.

* cited by examiner

PHOTON ENHANCED THERMIONIC EMISSION

CROSS REFERENCE TO RELATED APPLICATIONS

This application claims the benefit of U.S. provisional patent application 61/196,268, filed on Oct. 16, 2008, entitled "Thermally Enhanced Photoemission for Energy Harvesting", and hereby incorporated by reference in its entirety.

GOVERNMENT SPONSORSHIP

This invention was made with Government support under contract number DE-AC02-76SF00515 awarded by the Department of Energy. The Government has certain rights in this invention.

FIELD OF THE INVENTION

This invention relates to harvesting of radiant energy, such as solar energy.

BACKGROUND

Conversion of sunlight into electricity usually takes one of two forms: the "quantum" approach using the large energy of solar photons in photovoltaic (PV) cells, or the "thermal" approach using solar radiation as the heat source in a classical heat engine. Quantum processes boast high theoretical efficiencies as the effective photon "temperature" is $T_{solar} \sim 5800°$ C., yet suffer in practice from a limited spectral energy collection window and thermalization losses. Thermal processes take advantage of energy throughout the entire spectrum, but efficiency is curbed by practical operating temperatures. Combinations of the two are predicted to have efficiencies >60%, yet fail in practice because PV cells rapidly lose efficiency at elevated temperatures, while heat engines rapidly lose efficiency at low temperatures. As a result, these two approaches remain disjointed.

Hot-carrier solar energy converters provide a helpful example of the difficulties typically encountered in combining quantum and thermal conversion approaches. In hot-carrier solar energy converters, efficiency is improved by having photo-generated electrons be emitted from a cathode before thermalization of the generated electrons with respect to the cathode can occur. If this can be accomplished, efficiency can be significantly increased, because a significant source of loss (i.e., thermalization in the cathode) is thereby mitigated. However, typical thermalization time scales in condensed matter are on the order of picoseconds, so it is extremely difficult to provide high-efficiency emission of non-thermalized (i.e., hot) electrons.

Accordingly, it would be an advance in the art to provide combined thermal and quantum conversion that can more readily be realized in practice.

SUMMARY

In the present approach, a physical effect referred to as Photon Enhanced Thermionic Emission (PETE) is exploited to provide improved efficiency for energy conversion by harvesting both thermal and photon energy via an electron emission process. Briefly, a hot (greater than 200° C.) semiconductor cathode is illuminated such that it emits electrons to a collector anode. Because the cathode is hot, significantly more electrons are emitted than would be emitted from a room temperature (or colder) cathode under the same illumination conditions, or by thermionic emission without illumination. In PETE, the cathode electrons can be (and typically are) thermalized with respect to the cathode. As a result, PETE does not rely on emission of "hot" non-thermalized electrons, and is significantly easier to implement than hot-carrier emission approaches.

BRIEF DESCRIPTION OF THE DRAWINGS

FIG. 4b shows the quantum yield corresponding to the efficiency-maximizing affinities of FIG. 4a.

DETAILED DESCRIPTION

The present approach to solar power conversion is referred to as Photon Enhanced Thermionic Emission (PETE), because it uses photon excitation in conjunction with thermal processes to generate electricity. Calculations here show that the use of both heat and photon energy from the solar spectrum allows the PETE process to exceed the Shockley-Queisser limit on single-junction photovoltaics (W. Shockley and H. J. Queisser, J. App. Phys. 32, 510 (1961)), and simulated nanomaterials show even higher possible performance. Unlike PV cells, PETE operates at the temperatures compatible with solar thermal conversion systems (300-800° C.), enabling an efficient two-stage cycle with theoretical efficiencies >50%, providing a novel approach to efficient large scale solar power conversion.

In a conventional PV cell, incident above-band gap photons excite electrons into the conduction band and leave holes in the valence band, which are then collected by electrodes. The major losses are due to ineffective use of the solar spectrum: photons with less energy than the band gap are not absorbed, which is known as absorption loss ($\eta_{abs}$), while electrons which absorb photons with energies greater than the band gap release their extra energy in the form of heat, which is known as thermalization loss ($\eta_{thermalization}$) In silicon solar cells, these two processes account for approximately 50% of the incident solar energy, which is the majority of the total energy loss. Unfortunately, photovoltaic cells cannot reclaim this thermal energy since waste heat harvesting requires elevated operating temperature, and heating a conventional photovoltaic cell is highly detrimental due to increased dark current, resulting in an approximately linear decrease in open circuit potential with temperature.

PETE offers a route to generating photocurrent which recycles this 'waste heat'. PETE is based in part on thermionic emission, where a fraction of Boltzmann-distributed electrons have sufficient thermal energy to overcome the material's work function and emit into vacuum. This current is governed by the Richardson-Dushman equation: $J = A^* T^2 e^{-\phi_e/kT}$ where $A^*$ is the material-specific Richardson constant, and $\phi_e$ is the work function. Traditional thermionic conversion is plagued by low operating voltages, high required temperatures (>1200° C.), and space-charge effects largely due to the high currents necessary for power conversion. However, when photons are absorbed in a semiconductor, electrons are excited into the conduction band and establish an electron 'quasi-Fermi level' $E_{F,eff}$ which is considerably higher than the 'dark' Fermi level, $E_{F,i}$.

Figure 1:
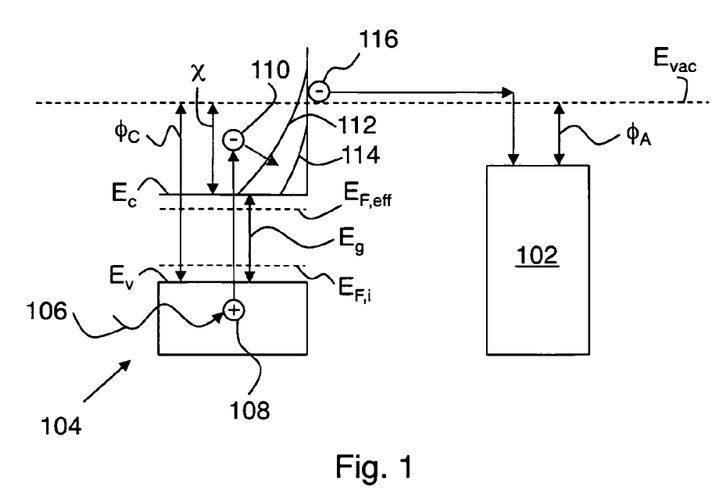
FIG. 1 shows a band diagram relating to operation of embodiments of the invention.

FIG. 1 shows relevant band structure parameters. A cathode 104 and anode 102 have respective work functions $\phi_C$ and $\phi_A$ with respect to the vacuum level $E_{vac}$. Cathode 104 is a semiconductor having a valence band $E_V$ and conduction band $E_C$ separated by an energy gap $E_g$. The electron affinity $\chi$ is the energy separation between the vacuum level and cathode conduction band. When cathode 104 is not illuminated, a conduction band electron distribution 114 is present, having a concentration dependent on cathode temperature and cathode device parameters. As is well known in the art, this concentration can be expressed in terms of the above-referenced dark Fermi level, $E_{F,i}$.

When cathode 104 is illuminated, photons (one of which is shown as 106) can be absorbed to generate electron-hole pairs (here the hole of a pair is shown as 108 and the corresponding electron is shown as 110). Generated electrons (e.g., electron 110) are assumed to thermalize within the cathode conduction band, thereby giving rise to a conduction band electron distribution 112 that has greater concentration than the 'dark' distribution 114. As is well known in the art, this concentration can be expressed in terms of the above-referenced electron quasi-Fermi level, $E_{F,eff}$.

As seen in FIG. 1, this boosts the entire electron energy distribution by $E_{F,eff} - E_F = kT(n/n_{eq})$, where n is the total conduction band electron density including photocarriers, and $n_{eq}$ is the equilibrium carrier concentration in the absence of illumination. A greater number of thermally-distributed electrons in the conduction band are then able to surmount the electron affinity barrier $\chi$, with higher potential energies and lower temperatures than in thermionic emission. This PETE current can still be described by the Richardson-Dushman equation by redefining the work function relative to $E_{F,eff}$. Each emitted electron carries both the energy of the photon that excited it into the conduction band and the thermal energy needed to overcome $\chi$, thus harvesting both types of energy. One such emitted electron is shown as 116 on FIG. 1. Emitted electrons are received by anode 102.

Figure 2:
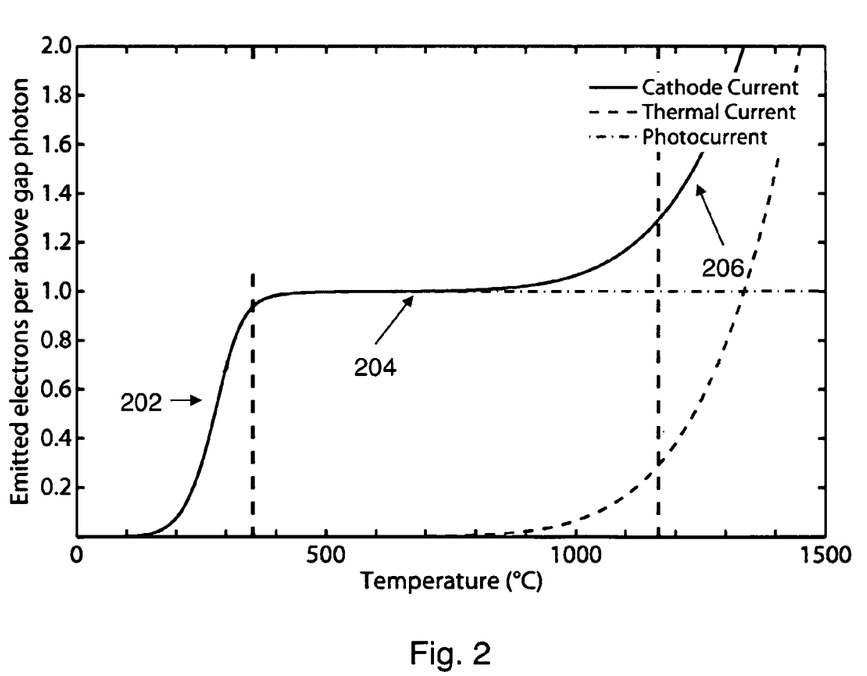
FIG. 2 show an example of electron emission from a cathode illuminated with 100× solar radiation as a function of cathode temperature.

FIG. 2 shows the effect of illumination on thermal electron emission from semiconductors. This example assumes $\chi=0.6$ eV, $E_g=1.1$ eV and 100× solar concentration. Total current is shown with a solid line, thermionic current is shown with a dashed line, and photocurrent is shown with a dash-dotted line. At low temperatures, thermalized carriers cannot overcome $\chi$ and recombine instead. Thermionic emission remains negligible in this example until ~1000° C., when electrons can overcome the material work function. However, with 100× solar illumination substantial electron emission can occur at 350° C., fully 1000° C. lower than the equivalent thermionic current. The magnitude of this current depends directly upon the number of absorbed photons, as can be seen by rewriting the PETE current as:

$$J_{PETE} = \frac{en}{4}\langle v \rangle e^{-\chi/kT}$$

where $\langle v \rangle$ is the average thermal velocity. Illumination is clearly seen to increase current through the conduction band concentration n, while thermal excitation determines the rate electrons can overcome $\chi$. Significantly, this process does not require non-equilibrium 'hot' electrons, and assumes complete thermalization. On FIG. 2, it is helpful to regard temperature range 202 as pertaining to a photoemission regime, where the thermal contribution is negligible, and temperature range 206 as pertaining to a thermionic regime, where the thermal dark current is non-negligible. The intermediate temperature regime 204 pertains to photon enhanced thermionic emission. For fixed cathode parameters, power output decreases as temperature increases, due to the increase of cathode Fermi level as temperature increases.

Illumination also increases the output voltage at a given temperature. The 'flat band' voltage generated by the PETE process with no field between cathode and anode is given by:

$$V_{fb} = \phi_C - \phi_A = (E_g - E_F + \chi) \phi_A,$$

where $\phi_C$ is the cathode work function, and $\phi_A$ is the anode work functions, which are both assumed to be 0.9 eV. Here the large per-quanta photon energy directly boosts the output voltage by $E_{F,eff} - E_F$ which is often a sizeable fraction of the band gap (on the order of one volt), while $\chi$ represents a 'thermal voltage'. The combination of the two provides a significant boost over the voltage of a thermionic process. However, as in photovoltaic cells, there is a tradeoff between higher voltages (large $E_g$), and lower photon absorption, requiring parameter optimization.

Figure 3A:
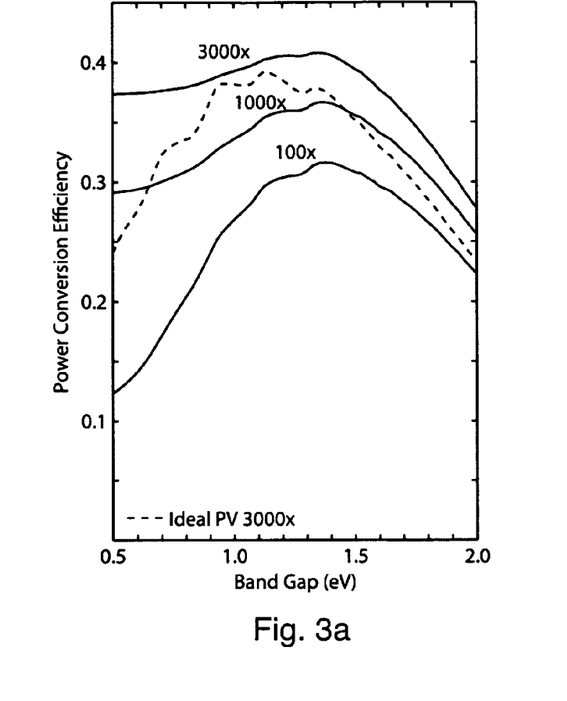
FIG. 3a shows an example of calculated PETE efficiency as a function of cathode band gap, where cathode electron affinity and temperature are optimized to maximize efficiency.
Figure 3B:
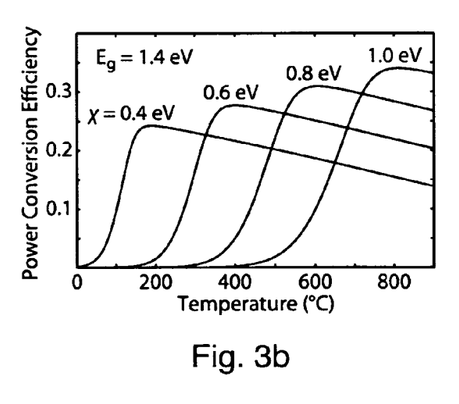
FIG. 3b shows examples of calculated PETE efficiency as a function of cathode temperature for several values of electron affinity.
Figure 3C:
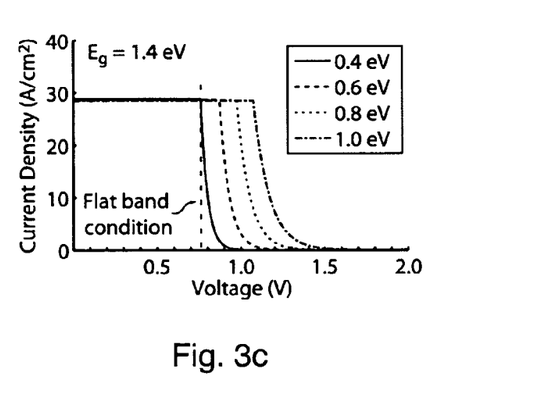
FIG. 3c shows J-V curves corresponding to the examples of FIG. 3b.

The theoretical power conversion efficiencies for a number of different material properties, solar concentrations, and operating temperatures are shown in FIGS. 3a-c. The steady-state concentration electron n was solved self-consistently accounting for PETE, Auger, and radiative recombination processes, and the power efficiency was calculated as $\eta = IV/P_{solar}$. Materials parameters were chosen to be as realistic as possible based on p-type ($10^{18}$ cm$^{-3}$) Si, and calculations assume full thermalization of one carrier for each photon $hv > E_g$, with all sub-bandgap photons absorbed in the cathode as heat.

Maximum efficiencies occurred for $E_g=1.1-1.4$ eV, topping 30% for 100× concentration and 42% for 3000× concentration. Impressively, PETE exceeds the Shockley-Queisser limit for a single junction cell for concentrations above 1000× even including realistic recombination losses, as exemplified by a direct comparison of PETE and ideal PV at 3000× (dashed line). This is due to PETE harvesting heat as described above. Higher efficiencies are possible at higher temperatures (FIG. 3b) by enabling electrons to overcome a larger χ and thus generate higher output voltages. Efficiencies above 30% are possible even at 550° C., which would match the input temperature for many commercial steam systems.

Since PETE current is determined by thermionic emission, the current-voltage characteristics are significantly different from those of photovoltaic cells (FIG. 3c). The maximal power point occurs at an output voltage slightly less than $V_{fb}$, which increases with $E_g$ or χ, as shown here. For $V>V_{fb}$ the current decreases exponentially, which reflects the distribution of emitted electron energies. This rapid decay leads to very large fill-factors (FF), often exceeding 90%.

Figure 4A:
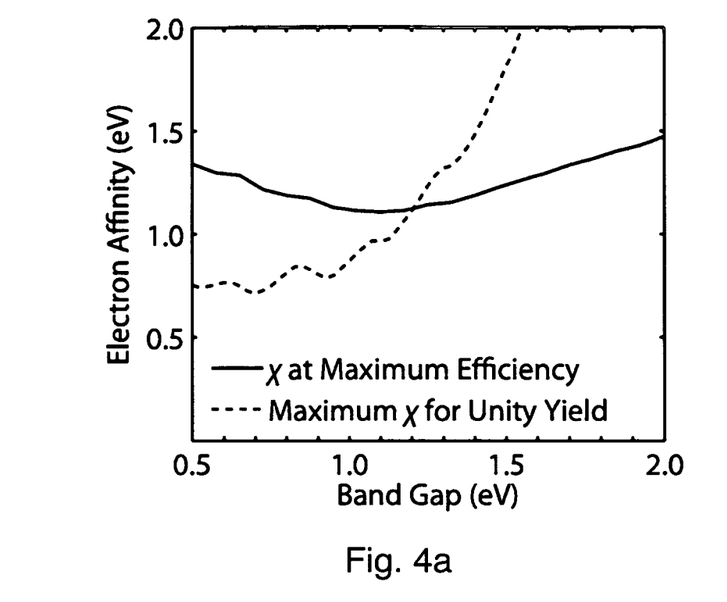
FIG. 4a shows electron affinities that maximize the efficiencies of the example of FIG. 3a. The maximum electron affinity that provide unity emission (ignoring blackbody losses and reverse currents) is also shown.
Figure 4B:
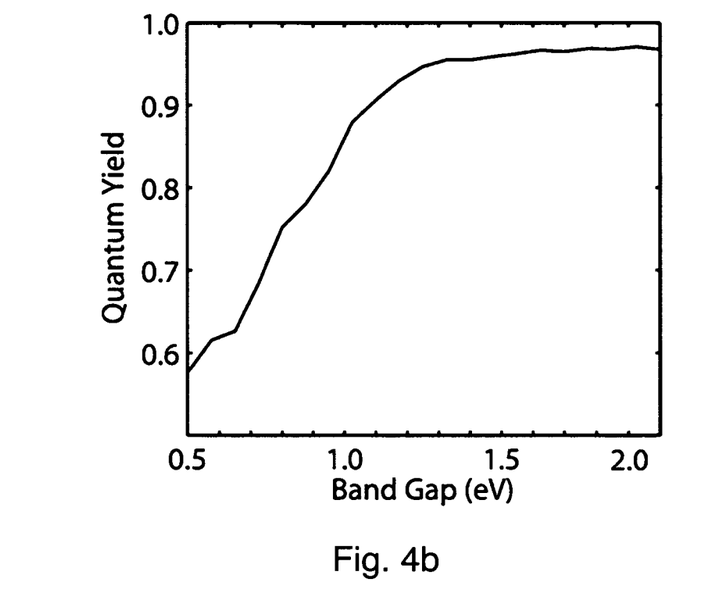

Further insight into the results of FIGS. 3a-c are provided by FIGS. 4a-b. On FIG. 4a, the solid line shows the χ at which device efficiency is maximized, and the dashed line shows the maximum χ at which unity emission efficiency is obtained (neglecting blackbody losses and reverse currents). A noteworthy feature of these results is that the χ at which device efficiency is maximized can be significantly above the maximum χ for unity emission efficiency (i.e., left half of FIG. 4a). The reason for this is that the output voltage at unity yield can be very low. In such cases, it is beneficial to reduce yield (i.e., current) in exchange for higher output voltage. FIG. 4b shows the yield for the optimized devices of FIG. 3a. It is apparent that optimization of low bandgap devices leads to reduced yield, while the yield for bandgaps above 1.2 eV is about 95%.

Figure 5A:
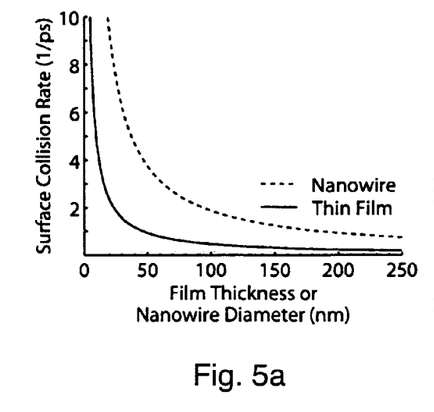
FIG. 5a shows calculated surface collision rates vs. thickness for thin film and nanowire geometries.

Nanostructuring can dramatically increase PETE's performance by decoupling photon absorption and electron emission lengths. Forests of nanowires or nanotubes have achieved near unity absorption over a wide spectral range through a combination of low effective index and scattering processes, effectively eliminating the requirement of thick films for maximal light absorption. Thin nanowires can thus be used to ensure each photoexcited electron is within the electron escape length of the material surface. Enhanced emission efficiency also results from an increased surface collision rate and lifetime. Nanowire simulations show the surface collision rate increases as 1/D, where D is nanowire diameter, as the electron is always within one diameter from a wall. (FIG. 5a) The nanowire geometry is further beneficial as the electron may escape from all directions perpendicular to the axis, increasing surface collision rate by a factor of four over thin films. This effect may also be advantageous for traditional photoemission cathodes. On FIG. 5a, the solid line relates to thin films, while the dashed line relates to nanowires. Nanowire surface collision rates are seen to significantly exceed thin film collision rates.

Figure 5B:
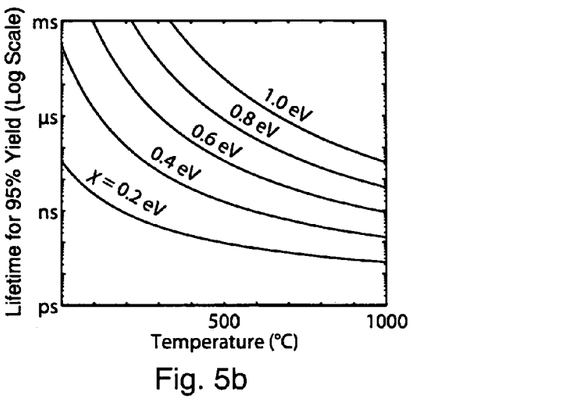
FIG. 5b shows calculated electron lifetimes needed for 95% emission efficiency as a function of temperature for various electron affinities.

Increasing carrier lifetime also enhances conversion efficiency by increasing the number of surface collisions and therefore chances for electron emission. FIG. 5b shows the required carrier lifetime for 95% emission efficiency from a 40 nm diameter nanowire as a function of electron affinity and temperature. These lifetimes are feasible with suitable surface passivation, as recent published photoluminescence experiments on silicon nanowires have demonstrated lifetimes of over 50 μs for 1-4 eV photo-illumination. For 50 nm diameter nanowires, this lifetime corresponds to ~$10^8$ surface collisions (one every 500 fs) prior to recombination, such that even a low per-collision escape probability can yield extremely high quantum efficiencies. Due to the logarithmic dependence of performance on lifetime, even nanosecond lifetimes are sufficient to obtain high efficiencies.

Figure 6A:
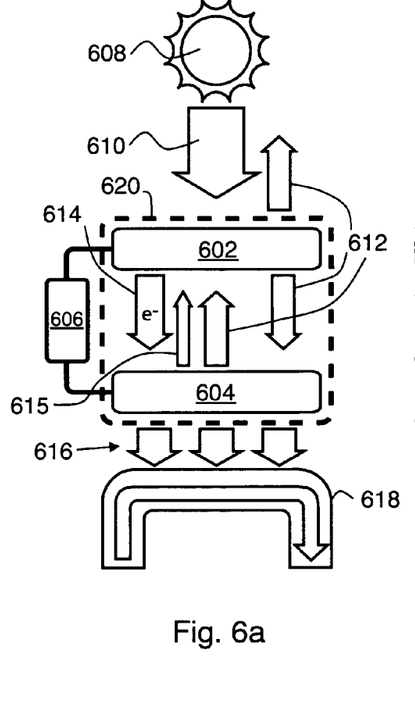
FIG. 6a shows an exemplary embodiment of the invention, along with energy and electron flows.

An important advantage of PETE over PV cells is operation at high temperatures so that unused heat energy can be used to power solar thermal generators, such as steam turbines or Stirling engines. A diagram of the energy flow in a PETE/solar thermal tandem architecture is shown in FIG. 6a.

In this example, energy source 608 provides radiant energy 610 which is incident on cathode 602. Electron current 614 emitted from cathode 602 is received at anode 604. As a result, PETE device 620 including cathode 602 and anode 604 is capable of providing electrical power to an external load 606. Also shown on FIG. 6a are reverse electron current 615 and radiant blackbody emission 612 from anode and cathode. Loss due to these processes is included in the preceding calculated results. Preferably, the temperature of the cathode is passively determined by heat transfer to and from the cathode. In this situation, no separate heating and/or temperature control for the cathode is needed, and the combination of incident radiation and suitable heat engines and/or heat sinking can keep the cathode and anode at their intended operating temperatures.

Figure 6B:
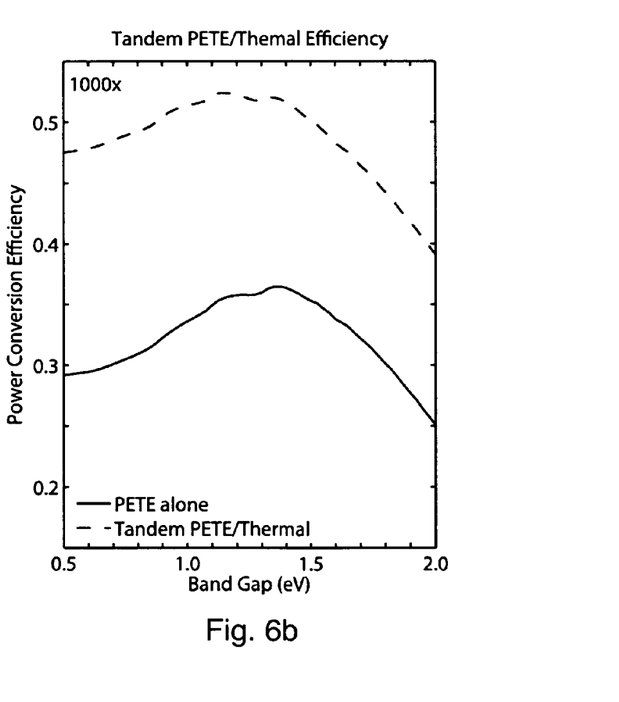
FIG. 6b shows calculated efficiencies for an exemplary PETE device and for this PETE device in combination with a heat engine for recovering heat from the PETE device anode.

Electrons and photons emitted from the PETE cathode deliver heat energy to the anode. A thermal engine 618 can remove this excess heat 616 from the anode and use it to generate additional electrical power. Tandem PETE/solar thermal efficiency for a concentration of 1000× suns is displayed in FIG. 6b, assuming an anode temperature of 285° C. and a thermal-to-electricity efficiency of 31.5%, based on Rankine steam systems. The solid line on FIG. 6b is for PETE alone, and the dashed line is for PETE+heat engine. Total conversion efficiencies exceeding 52% are possible, constituting more than a 65% improvement over a thermal cycle alone. This dramatic improvement is possible because the PETE process harvests a sizable fraction of its energy from quantized high-energy photons, effectively capitalizing on the 5800° C. to $T_{cathode}$ temperature differential which is normally discarded. Although this example shows a heat engine operating at the anode, it is possible to harvest heat from the cathode and/or anode with heat engines.

By utilizing both thermal and photon energy, PETE can potentially achieve device efficiencies which exceed the fundamental limits on single junction cells and rival those of complex multi-junction cells, the best of which are around 40% efficient. Even a PETE module with modest 20% efficiency in tandem with a 30% efficient thermal engine could achieve total system efficiencies of 44%, which would exceed the current records for either single or multi-junction cells. PETE devices are naturally synergistic with solar thermal convertors, and could be implemented as a modular attachment to existing infrastructure. Further efficiency improvements may be possible through new materials, nanostructures, and processes such as plasmonics that can increase light absorption, electron concentration, and emission probability.

Design principles that have been identified to date include the following. The operating temperature of the cathode is greater than 200° C. and is preferably between 300° C. and 1000° C. The cathode band gap, at the operating temperature, is preferably between 1 eV and 2 eV. Any semiconductor having a bandgap in this range can be employed as the cathode material. Suitable cathode materials include but are not limited to diamond, Si, SiC, and GaAs. The cathode electron affinity, at the operating temperature, is preferably between 0 eV and 1 eV. Solar concentration is preferably greater than 100 suns. A parallel plate arrangement of cathode and anode is a preferred device geometry. The anode work function is preferably less than 2.5 eV and is more preferably less than 2 eV, and still more preferably is as low as possible.

Figure 7A:
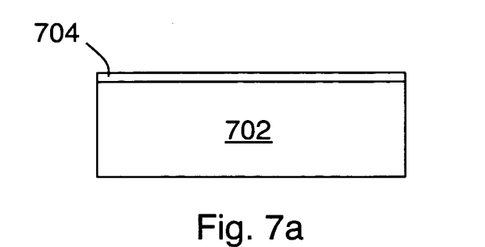
FIGS. 7a-b show examples of cathode and anode structures having surface coatings.

FIG. 7a shows an example of a cathode structure having a surface coating. Here coating 704 is disposed on cathode 702. Such coatings are helpful for setting the cathode electron affinity. Suitable materials for coating 704 include Ba, Sr, Cs, their respective oxides, and any alloy or mixture thereof. Diamond and diamond-like thin films can also be suitable cathode coatings. The cathode and any cathode surface coating that may be present are preferably designed and selected to withstand high temperature operation (i.e., temperature greater than 200° C.).

Figure 7B:
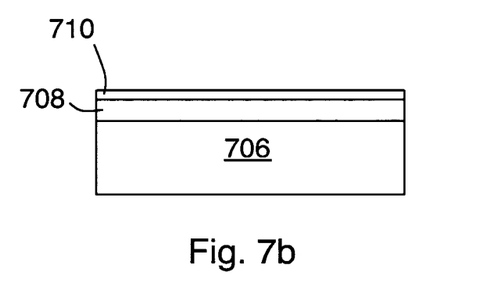

FIG. 7b shows an example of a anode structure having a surface coating. In this example, a transparent conductive oxide, such as fluorinated indium-tin-oxide (FTO) 706 is covered with metallic or metal oxide surface films to lower the work function. For example, these films can be a thin film of tungsten 708 with an over layer of BaO 710. Diamond and diamond-like thin films can also be suitable anode coatings. Phosphorous doped diamond has the lowest reported work function, and is accordingly a preferred anode coating. The anode and any anode surface coating that may be present are preferably designed and selected to withstand high temperature operation (i.e., temperature greater than 200° C.). Any other anode materials/structures capable of withstanding high temperature and providing a low work function can also be employed.

Figure 8:
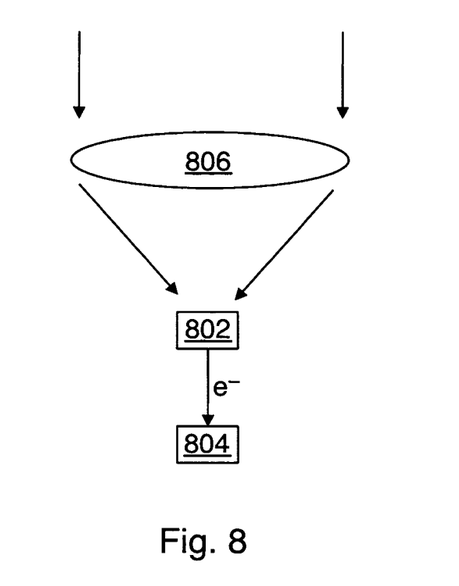
FIG. 8 shows an example of a concentrator arrangement.

FIG. 8 shows an example of an optical concentrator arrangement. In this example, incident radiation is focused and/or concentrated by concentrator 806 to increase the incident intensity on cathode 802. Electrons emitted from cathode 802 are received at anode 804, and can provide electrical power as described above. Suitable optical concentrators are well known in the art.

Figures 9A, 9B:
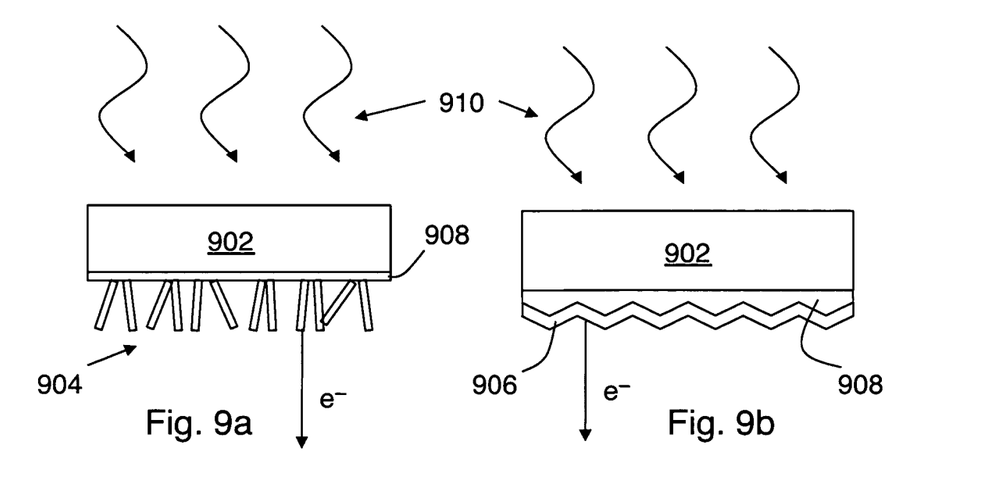
FIGS. 9a-c show examples of nano-structured cathodes.
Figure 9C:
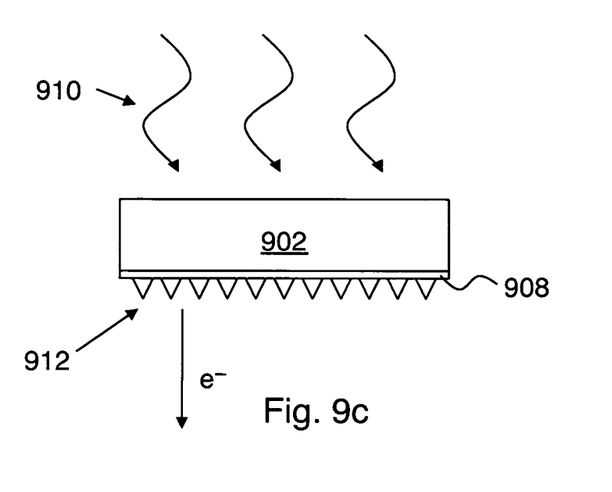

FIGS. 9a-c show examples of nano-structured cathodes. Nano-structuring of the cathode is helpful for reducing the photon absorption length in the cathode, compared to a corresponding unstructured thin film cathode of the same cathode material. Such reduction of the absorption length is helpful for improving device efficiency, because it reduces recombination loss. Any nano-structuring geometry that provides a reduced photon absorption length can be employed. Some specific examples are shown on FIGS. 9a-c.

In these examples, incident radiation is shown as 910, a transparent mechanical substrate is shown as 902, and a transparent and electrically conductive layer (e.g., indium tin oxide (ITO)) is shown as 908. On FIG. 9a, the cathode material is disposed as a forest of nano-wires or nano-tubes 904. On FIG. 9b, the cathode material is disposed as a textured nano-layer 906 having nano-scale lateral features (i.e., less than 500 nm feature size) determined by corresponding features of layer 908. The features of layer 908 can be any shapes, such as cones or pyramids. On FIG. 9c, the cathode material is disposed as nano-cones or nano-pyramids 912 of emitter material. In this example, the islands of emitter material have less than 500 nm feature size. Alternatively, any other nano-scale shape for the islands of emitter material can be employed.

Figure 10:
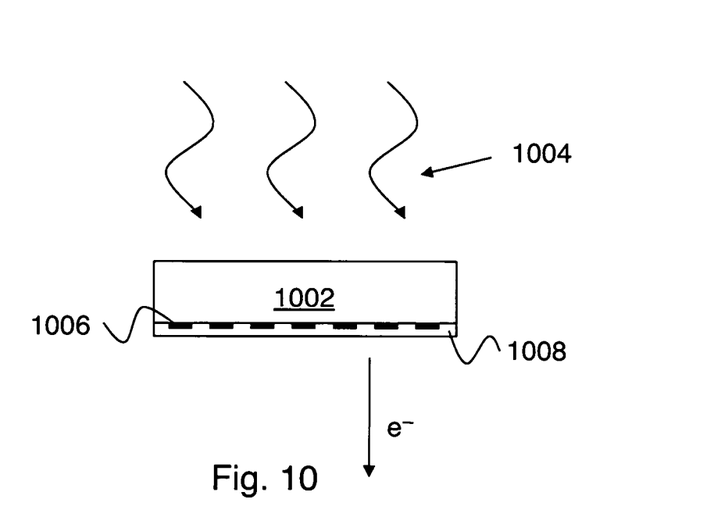
FIG. 10 shows an example of a cathode including a surface plasmon concentrator.

FIG. 10 shows an example of a cathode including a surface plasmon concentrator. In this example, incident radiation 1004 passes through substrate 1002 and induces electron emission from cathode 1008. A metallic plasmon concentrator 1006 is disposed such that enhanced fields associated with plasmon resonances and/or surface plasmon resonances of concentrator 1006 extend into cathode 1008. Design principles of suitable metallic structures to act as plasmon concentrators are known in the art. In some embodiments, cathode emitter material islands are disposed in alignment with plasmon resonances. For example, cathode nano-cones or nano-pyramids as in FIG. 9c can be disposed at locations in the device where plasmon-resonance enhanced fields are present.

The invention claimed is:

1. Apparatus for radiant energy conversion, the apparatus comprising:
    a semiconductor photocathode having a positive electron affinity surface; and
    an anode separated from said photocathode;
    wherein absorption of incident radiation in said photocathode during operation of said apparatus gives rise to a distribution of electrons in a conduction band of said cathode;
    wherein some or all electrons in said distribution are thermalized with respect to a temperature of said photocathode, wherein said temperature of said photocathode is greater than 200° C. during operation of said apparatus;
    wherein some or all electrons in said distribution are emitted from said photocathode and received by said anode;
    wherein a potential difference is established between said photocathode and said anode by electrons received at said anode to provide output electrical power;
    wherein said photocathode comprises a surface coating to determine said positive electron affinity;
    wherein an electron affinity of said photocathode is between 0 eV and 1 eV, and wherein said photocathode can operate at an operating temperature greater than 200° C.

2. The apparatus of claim 1, wherein said photocathode is nano-structured such that a photon absorption length in said photocathode is less than a photon absorption length in a corresponding thin film cathode.

3. The apparatus of claim 2, wherein said nano-structured photocathode comprises a forest of nano-wires or nano-tubes.

4. The apparatus of claim 2, wherein said nano-structured photocathode comprises a nano-layer of said semiconductor disposed on an electrically conductive and nano-textured substrate.

5. The apparatus of claim 2, wherein said nano-structured photocathode comprises nano-islands of said semiconductor.

6. The apparatus of claim 1, wherein a conversion efficiency from said incident radiation to said output electrical power is greater than 10%.

7. The apparatus of claim 1, further comprising a heat engine to generate work from heat generated at said anode and/or cathode.

8. The apparatus of claim 1, wherein said incident radiation comprises sunlight.

9. The apparatus of claim 1, further comprising an optical concentrator to increase an intensity of said incident radiation at said photocathode.

10. The apparatus of claim 1, further comprising a plasmon resonance concentrator to increase an intensity of said incident radiation at said photocathode.

11. The apparatus of claim 1, wherein said temperature of said photocathode is passively determined.

12. The apparatus of claim 1, wherein a work function of said anode is less than 2.5 eV and wherein said anode can operate at an operating temperature greater than 200° C.

* * * * *